United States Patent
Burky et al.

(10) Patent No.: US 7,472,258 B2
(45) Date of Patent: Dec. 30, 2008

(54) DYNAMICALLY SHARED GROUP COMPLETION TABLE BETWEEN MULTIPLE THREADS

(75) Inventors: William E. Burky, Austin, TX (US); Peter J. Klim, Austin, TX (US); Hung Q. Le, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 10/422,654

(22) Filed: Apr. 21, 2003

(65) Prior Publication Data
US 2004/0210743 A1 Oct. 21, 2004

(51) Int. Cl.
G06F 9/30 (2006.01)
(52) U.S. Cl. .................................. 712/218
(58) Field of Classification Search ............. 712/218
See application file for complete search history.

(56) References Cited

U.S. PATENT DOCUMENTS

| | | | | |
|---|---|---|---|---|
| 5,777,928 A * | 7/1998 | Vidwans et al. | ........ | 365/189.05 |
| 5,922,057 A * | 7/1999 | Holt | ............... | 710/52 |
| 6,219,728 B1 * | 4/2001 | Yin | ............... | 710/52 |
| 6,594,755 B1 * | 7/2003 | Nuechterlein et al. | ....... | 712/239 |
| 6,772,324 B2 * | 8/2004 | Akkary et al. | ............... | 712/235 |
| 6,854,075 B2 * | 2/2005 | Mukherjee et al. | ............ | 714/51 |
| 6,931,639 B1 * | 8/2005 | Eickemeyer | ................ | 718/104 |

FOREIGN PATENT DOCUMENTS

| | | |
|---|---|---|
| JP | 06-044089 | 2/1994 |
| JP | 06-332700 | 12/1994 |
| JP | 8-249195 | 9/1996 |
| JP | 2000-047887 | 2/2000 |
| JP | 2000-207233 | 7/2000 |
| JP | 2002-123402 | 4/2002 |

OTHER PUBLICATIONS

Akkary, Haitham, Hily, Sebastian. "The case for speculative multithreading on SMT processors." ISHPC 2000, pp. 59-72.*
Lo, Jack L., Emer, Joel S., Levy, Henry M., Stamm, Rebecca L., Tullsen, Dean M. "Converting Thread-Level Parallelism to Instruction-Level Parallelism via Simultaneous Multithreading." ACM Transactions on Computer Systems, vol. 15, No. 3, Aug. 1997, pp. 322-354.*

* cited by examiner

Primary Examiner—Eddie P Chan
Assistant Examiner—Jacob Petranek
(74) Attorney, Agent, or Firm—Casimer K. Salys; Winstead, P.C.

(57) ABSTRACT

An SMT system has a dynamically shared GCT. Performance for the SMT is improved by configuring the GCT to allow an instruction group from each thread to complete simultaneously. The GCT has a read port for each thread corresponding to the completion table instruction/address array for simultaneous updating on completion. The forward link array also has a read port for each thread to find the next instruction group for each thread upon completion. The backward link array has a backward link write port for each thread in order to update the backward links for each thread simultaneously. The GCT has independent pointer management for each thread. Each of the threads has simultaneous commit of their renamed result registers and simultaneous updating of outstanding load and store tag usage.

12 Claims, 5 Drawing Sheets

DYNAMICALLY SHARED GROUP COMPLETION TABLE BETWEEN MULTIPLE THREADS

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. If a processor has more functional units, then a lower percentage of those units may be doing useful work at any one time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless (just as adding another processor in a system that uses a singly threaded program is useless in a traditional multiprocessor (MP) system). One approach to making the functional units in a CMP more efficient is to use course-grained multithreading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (LP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to miss prediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

In an SMT processor that supports instructions from each thread executing concurrently, it is desirable for optimizing performance to have a means for each thread to complete instructions in the same cycle. The dynamic shared completion table (CT) prior art details a completion table structure that supports having instructions from each thread "in flight" at a given point in time, but does not describe a capability or means of completing groups of instructions for each thread in a single processor cycle.

There is, therefore, a need for a way to dynamically share a single group completion table (GCT) between two threads in an SMT system to allow for effective draining of the completion table, register file mappers, and outstanding load/store tags, such that a new instruction group may be allowed to dispatch and issue as soon as possible.

SUMMARY OF THE INVENTION

The dynamically shared group completion table (GCT) has a Next-to-Complete-Group (NTCG) read port for each thread corresponding to the completion table instruction/address array for simultaneous updating on completion. The forward link array also has an NTCG read port for each thread to find the next instruction group for each thread upon completion. The backward link array has a backward link write port for each thread in order to update the backward links for each thread to a NULL condition simultaneously. The GCT has independent linked-list head and tail pointer management, allowing for simultaneous traversal of the GCT by each thread at completion time. Each of the threads has simultaneous commit of their renamed result registers and simultaneous updating of outstanding load and store tag usage. This allows two thread groups to complete simultaneously in one clock cycle and allows for effective draining of the shared GCT, register file mappers, and outstanding load/store tags such that new instruction groups may be allowed to dispatch and issue as soon as possible thus improving SMT processor performance.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
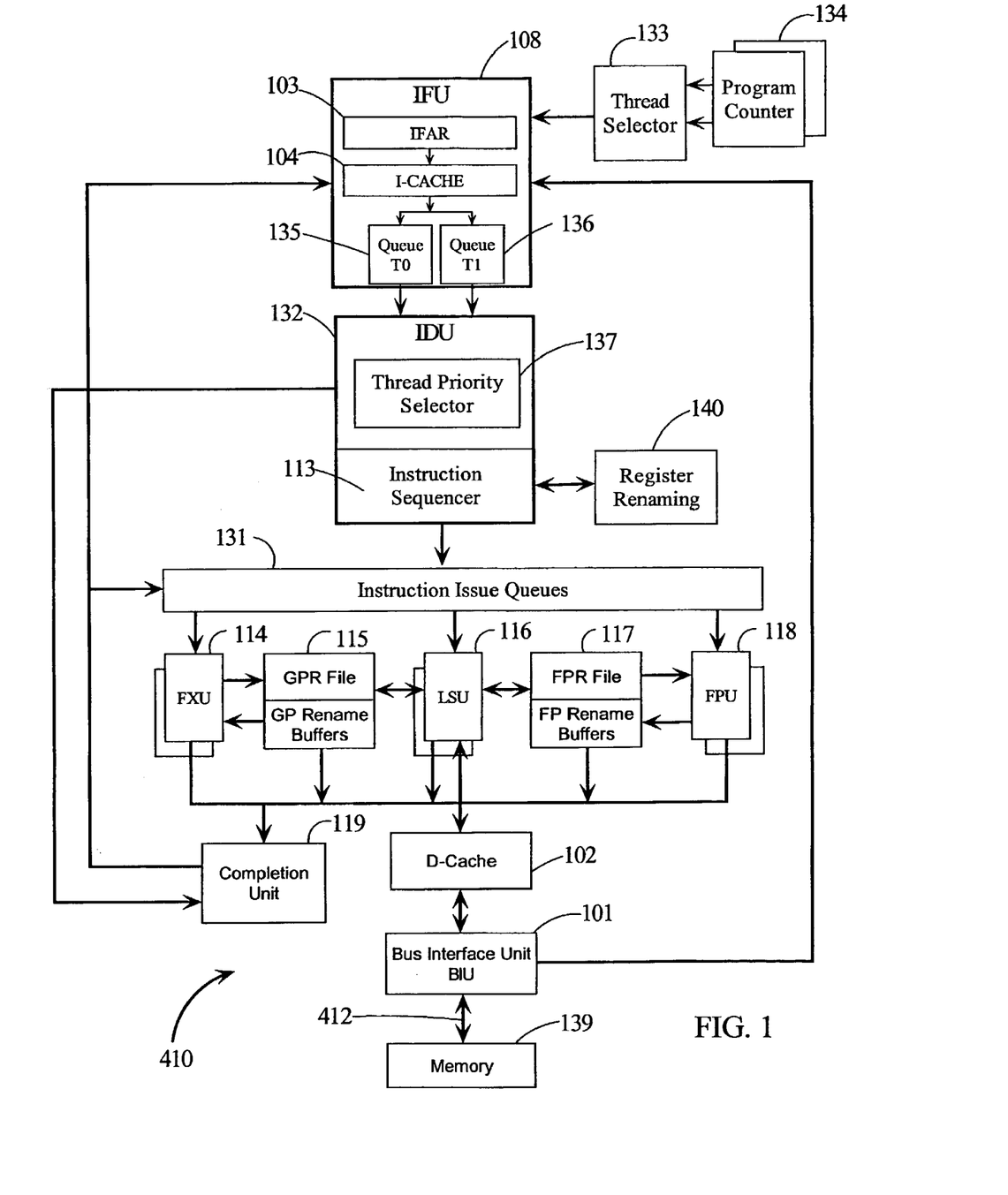
FIG. 1 is a block diagram of functional units in an SMT processor according to embodiments of the present invention.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are forwarded to instruction issue queue (IIQ) 131. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is put into an issue queue, each architected register is renamed. Each architected register that is being modified is assigned a physical register and a corresponding look-up table identifies physical registers that are associated with an architected register. Therefore in the issue queue, the architected register has been renamed so that multiple copies of an architected register may exist at the same time. This allows instructions to be executed out-of-order as long as source operands are available. Register renaming unit 140, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache 102 for near term use and/or forwarded to bus interface unit (BIU) 101 which sends the data over bus 412 to memory 139. LSU 116 may load data from D-Cache 102 for use by the execution units (e.g., FXU 114).

Operation of a shared group completion table (GCT) in an SMT processor is described in detail in U.S. patent application entitled "Method and System for Dynamically Shared Completion Table Supporting Multiple Threads In A Processing System," Ser. No. 09/687,078, with a filing date of Oct. 12, 2000. This application is incorporated by reference in the present application.

Figure 2:
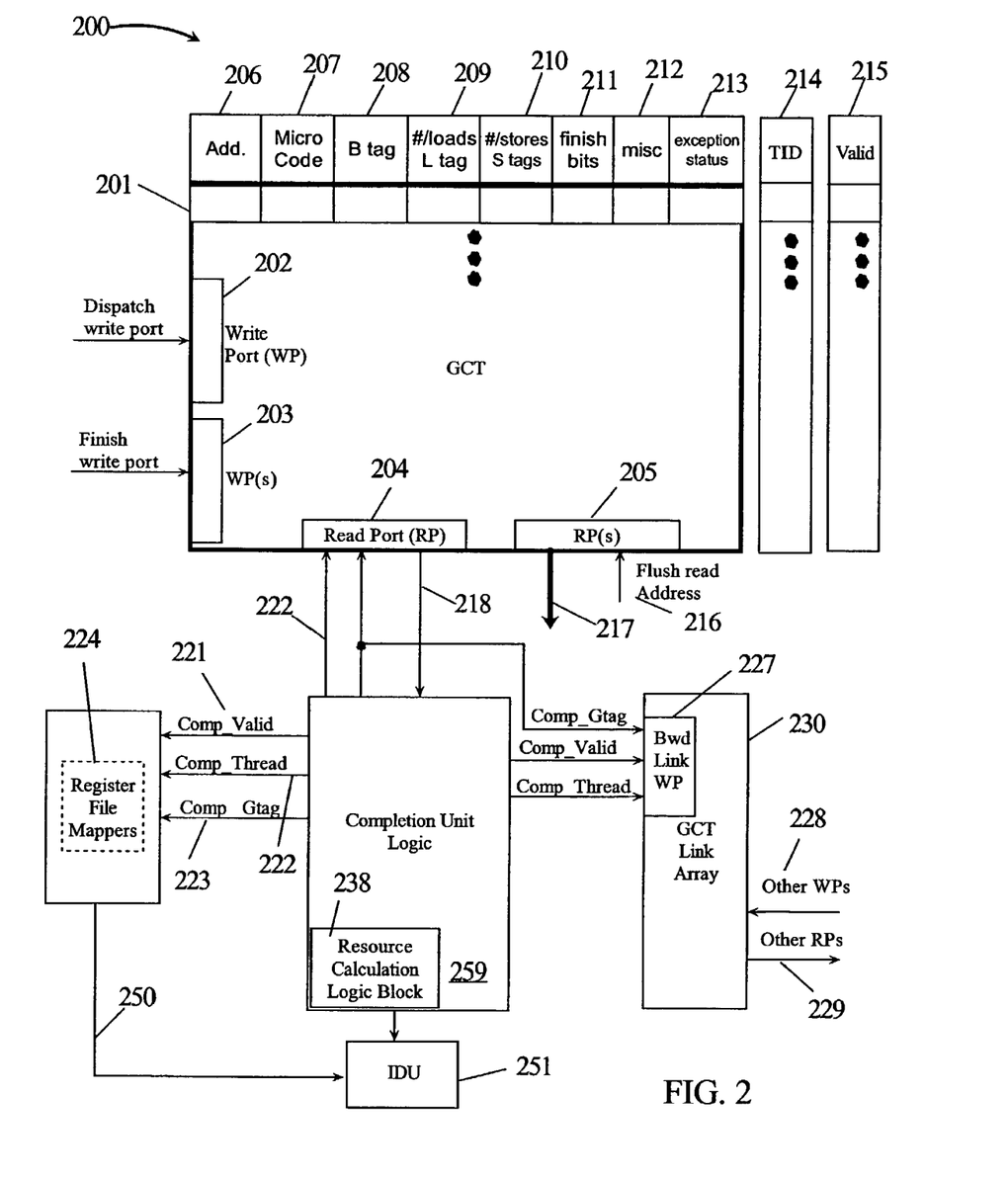
FIG. 2 is a block diagram of circuitry for completing a single instruction group per clock cycle in an SMT processor.

FIG. 2 is a block diagram of a completion unit 200 in an SMT processor with a GCT 201 coupled to an IDU 251 where only one instruction group completes per clock cycle. GCT 201 is shown with various entries. Entries in the GCT are typically written on a row basis. A row address 206 would correspond to a group of instructions and comprises microcode 207, branch instruction identification (Btag) 208, load instruction identification (Ltag) 209, store instruction identification (Stag) 210, finish bits 211, miscellaneous bits 212, and exception status 213. While thread identification (TID) 214 and valid bit 215 are associated with a row address 206, they are mapped into registers outside of the GCT 201 because they are accessed as columns at times. GCT 201 also has one dispatch write port 202 and one or more finish write ports 203. Read port 204 is coupled to a completion unit 259. One or more read ports 205 are coupled to a flush array (not shown) that generates a flush mask indicating which instructions to flush in response to a flush request.

Completion unit 200 has logic 259 for head and tail pointer management, Ltag and Stag management logic, exception handling logic, file mapper resource management logic, store queue management logic and branch instruction queue management logic. Resource calculation logic block 238 communicates with an IDU 251. Completion unit logic 259 sends completion valid 221, complete thread 222 and complete Gtag 223 to register file mappers 224. The file mappers 224 communicate with IDU 251 via signals 250. Since completion unit 259 completes one group per cycle, then on a given clock cycle completion valid 221, complete thread 222 and complete Gtag 223 would correspond to one thread. Completion unit 259 also couples the Gtag 223 and the complete thread 222 to GCT 201 and receives completion read data 218. GCT link array 230 has a backward link write port 227 for each thread coupled to completion unit logic 259, in order to allow completion unit 200 to update backward links to a NULL state in each thread simultaneously. Backward link write port 227 receives completion valid 221, complete thread 222 and complete Gtag 223 from completion unit logic 259.

While instructions are dispatched out-of-program order, they must complete in-program order. Instructions that have not completed may not release shared resources and thus may cause a slow down dispatch of additional instructions, thus slowing system operation. If only one group can complete per cycle, then various operations are slower in an SMT mode of operation. For example, if load/store units (e.g., 116) have data indicating which stores may be sent to memory, they can free store reorder queue (SRQ) entries sooner, paving the way for store instruction issues. Other operations releasing entries, for example, Load Miss Queue (LMQ) entries, Branch Instruction Queue (BIQ) entries, may likewise limit system performance if only one group may complete per clock cycle. When instructions complete, register renames are released. Rename registers are used in conjunction with general purpose registers (GPRs), floating point registers (FPRs), load registers (LRs), control registers (CTRs), and store registers (SRs). If the rename registers are being held awaiting instruction completion, then resources needed by other dispatching instructions may be unavailable. Exception conditions may occur during instruction execution. The exception status of an instruction is sent to the GCT by the execution units. The sooner exception status is known, the sooner exception handling logic can resolve the problem and improve the flow of instructions for execution.

Figure 3:
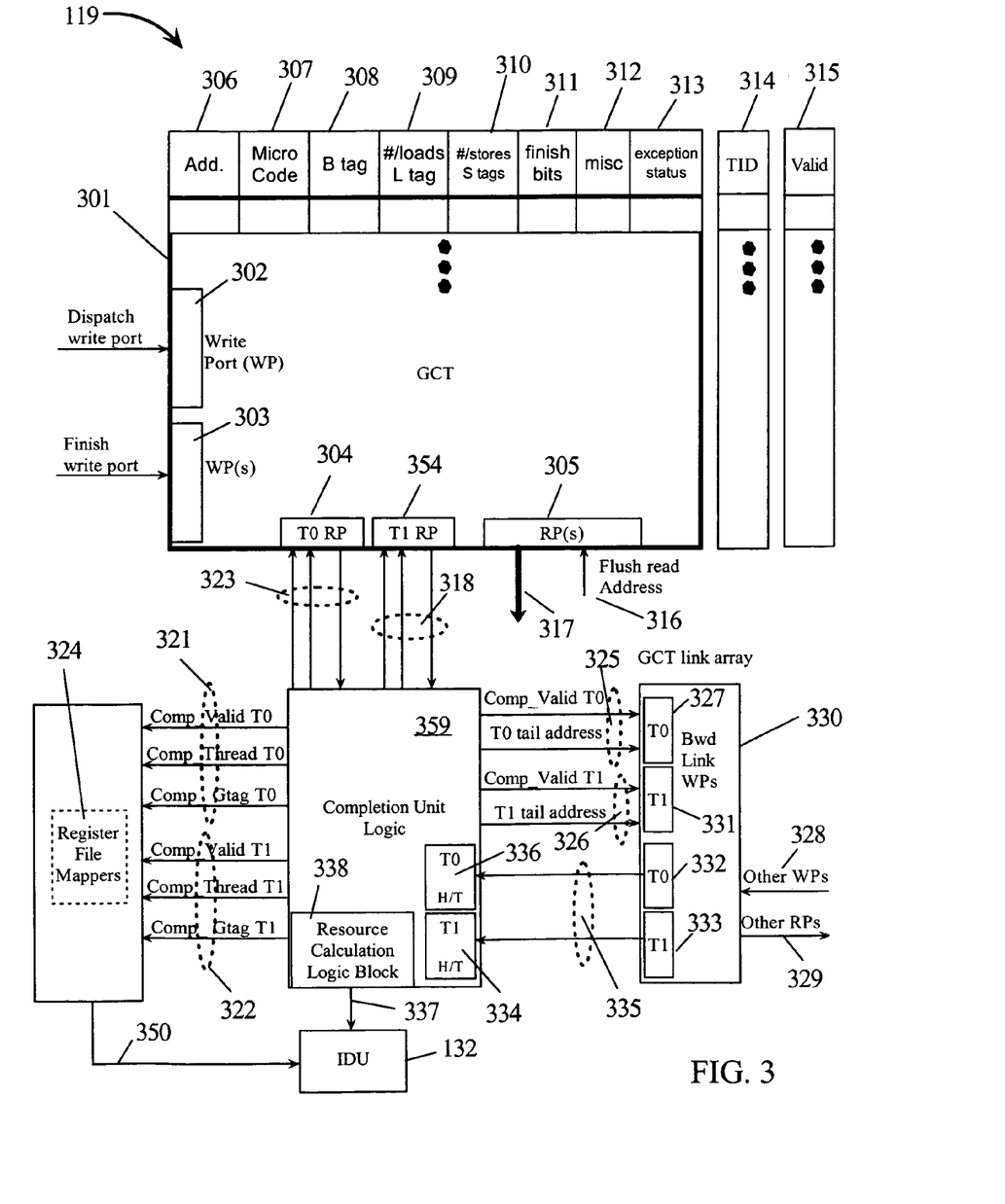
FIG. 3 is a block diagram of circuitry for completing two instruction groups, one per thread per clock cycle in an SMT processor.

FIG. 3 is a block diagram of completion unit 119 in SMT processor 410 with a GCT 301 coupled to IDU 132 where two instruction groups (one per thread) complete per clock cycle according to embodiments of the present invention. GCT 301 is shown with various entries similar to GCT 201 in FIG. 2. Entries in the GCT are typically written on a row basis. A row address 306 would correspond to a group of instructions and comprises microcode 307, branch instruction identification (Btag) 308, load instruction identification (Ltag) 309, store instruction identification (Stag) 310, finish bits 311, miscellaneous bits 312, and exception status 313. While thread identification (TID) 314 and valid bit 315 are associated with a row address 306, they are mapped into registers outside of the GCT 301 because they are accessed as columns at times. GCT 301 also has one dispatch write port 302 and one or more finish write ports 303. According to embodiments of the present invention, GCT 301 has read port 304 dedicated to T0 and read port 354 dedicated to T1. Since read ports 304 and 354 are dedicated to each thread, completion unit logic 359 may simultaneously couple signals 323 for T0 and signals 318 for T1 to GCT 301. Therefore, the complete thread and complete Gtag for both threads (in 323 and 318) may be coupled to GCT 301 and both threads may receive their completion read data (signals 318) simultaneously.

Completion unit logic 359 also simultaneously couples signals 321 for T0 and signals 322 for T1 to register file mappers 324. The register file mappers 324 are also coupled via signals 350 to IDU 132. Signals 321 comprises: Comp Valid_T0, Comp_Thread T0, and Comp_Gtag T0 for thread T0 and signals 322 comprises: Comp_Valid T1, Comp_Thread T1, and Comp_Gtag T1 for thread T1. Resource calculation logic block 338 is modified to handle resource calculations for both T0 and T1 simultaneous so that IDU 132 may be notified of freed resources with signals 337.

A register file an array of processor register in a central processing unit (CPU). IC-based register files are usually implemented by way of fast static RAMs with multiple ports. Such RAMs are distinguished by having dedicated read and write ports, whereas ordinary multi-ported SRAMs will usually read and and write through the same ports.

The instruction set architecture of a CPU will almost always define a set of registers which are used to stage data between memory and the functional units on the chip. In simpler CPUs, these architectural registers correspond one-for-one to the entries in a physical register file within the CPU. More complicated CPUs use register renaming, so that the mapping (e.g., register file mappers 324) of which physical entry stores a particular architectural register changes dynamically during execution. Register file mappers 324 provide the correspondence between the architected registers and the rename registers. Rename registers use information regarding instruction validity (comp Valid), instruction completing (Comp Gtag) and thread completing (Comp thread) to determine when to release registers and to update information in the rename registers.

GCT link array 330 has dual write ports coupled to completion unit logic 359, WP 327 for T0 receiving signals 325 and WP 331 receiving signals 326, in order to allow completion unit 119 to update backward links to a NULL condition simultaneously by thread. Completion unit logic 359 also has head (H) and tail (T) pointer management logic 336 and 334 for T0 and T1, respectively. This allows simultaneous traversal of GCT 301 by each thread at completion time. To support the dual H/T pointer management logic 336 and 334, GCT link array 330 has dual next to complete read ports, RP 332 for T0 and RP 333 for T1 for coupling the next instruction group for each thread in data 335. The dual H/T pointer management logic 334 and 336 along with RP 332 and 333 allows for simultaneous commit of each thread's renamed result registers and simultaneous updating of outstanding load and store tag usage by thread.

The described multiple dual porting allows completion unit 119 coupled to IDU 132 to complete two instruction groups per cycle. Because two instruction groups may complete in one cycle, LSUs 116 are notified sooner which data stores may be sent to memory, thus freeing SRQ entries in LSUs 116 sooner. Likewise, LMQ entries in LSUs 116, BIQ entries in a branch instruction unit (not shown) in IDU 132, and register rename entries in register rename 140 are released sooner. Completing instructions faster also leads to exception conditions and status being detected sooner.

Figure 5:
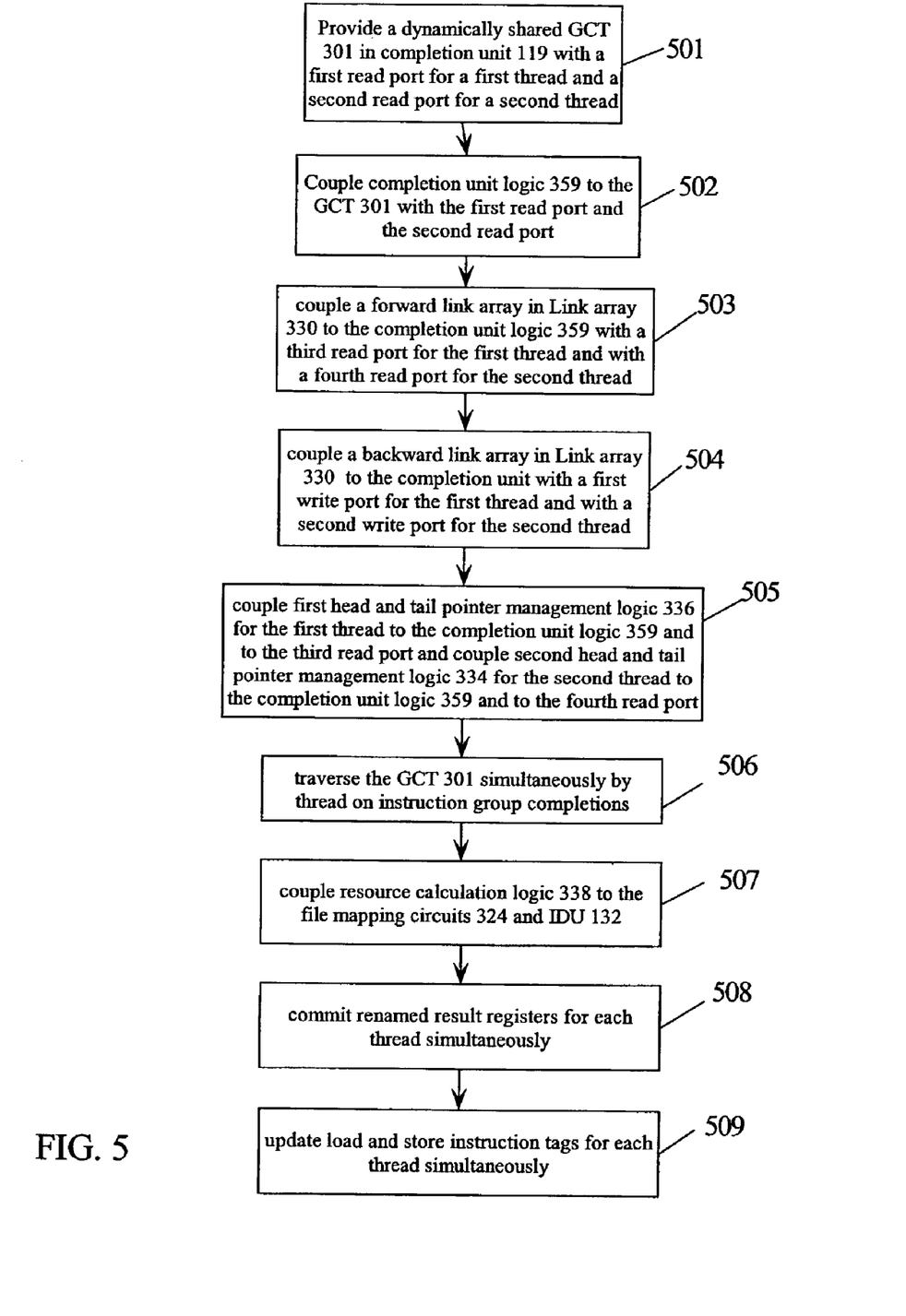
FIG. 5 is a flow diagram of method steps according to embodiments of the present invention

FIG. 5 is a flow diagram of method steps used in embodiments of the present invention. In step 501, a SMT processor 410 incorporates a dynamically shared GCT 301 in completion unit 119 with a first read port for a first thread and a second read port for a second thread. In step 502, a completion unit logic 359 is coupled to the GCT 301 with the first read port 304 and the second read port 354. A forward link array in GCT link array 330 is coupled to the completion unit logic with a third read port 332 for the first thread and a fourth read port 333 for the second thread in step 503. In step 504, a backward link array in GCT link array 330 is coupled to the completion unit logic 359 with a first write port 327 for the first thread and a second write port 331 for the second thread. In step 505, first head and tail pointer management logic 336 for the first thread is coupled to the completion unit logic 359 and the third read port 332. Likewise, second head and tail pointer management logic 334 for the second thread is coupled to the completion unit logic 359 and the fourth read port 333. In step 506, the GCT 301 is traversed simultaneously by thread on instruction group completions. Resource calculation logic 338 is coupled to the IDU 132 and file register mapping circuits 324 in step 507. In step 508, renamed result registers for each thread are committed simultaneously and in step 509 load and store instruction usage tags for each thread are updated simultaneously.

Figure 4:
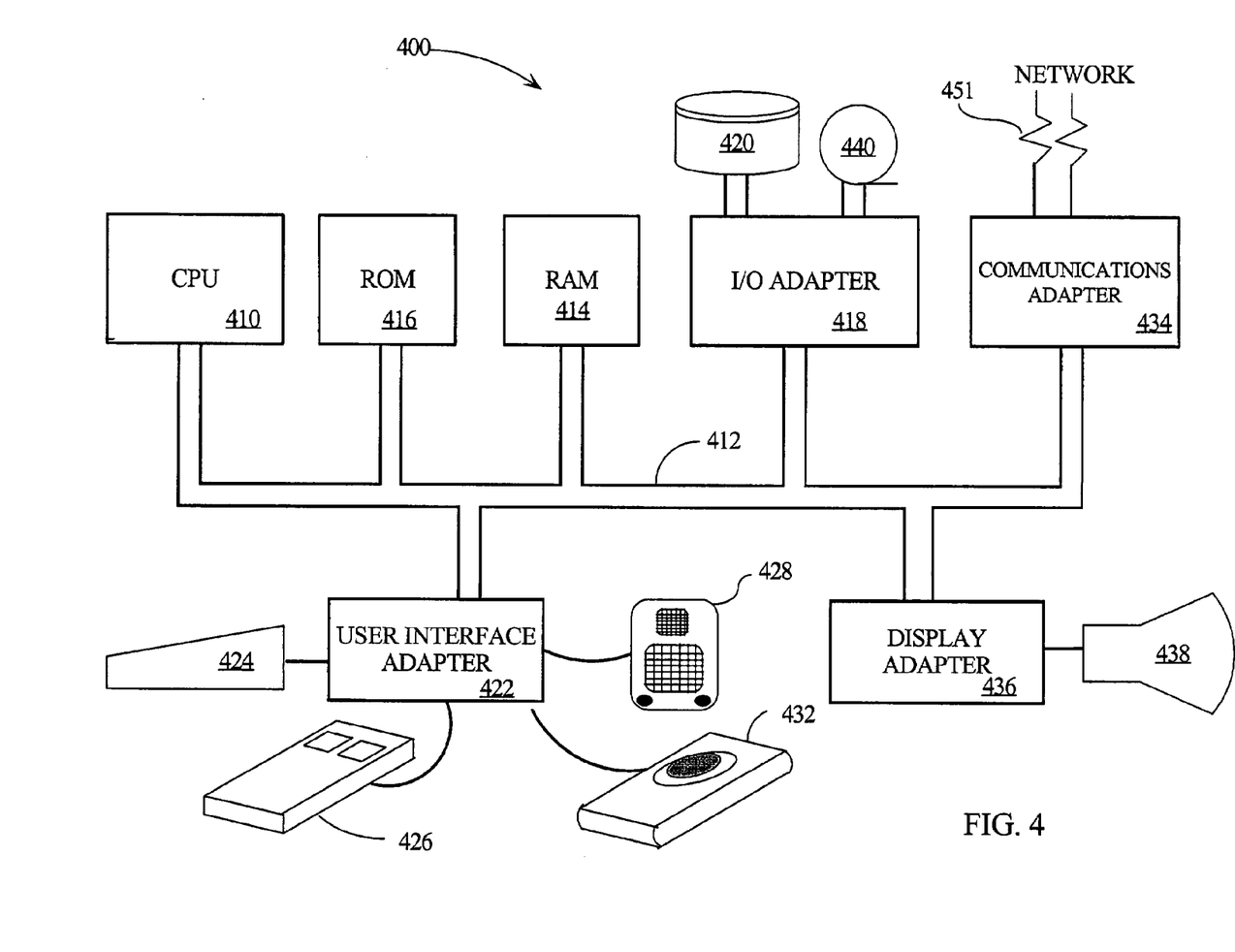
FIG. 4 is a representative hardware environment for practicing the present invention.

A representative hardware environment for practicing the present invention is depicted in FIG. 4, which illustrates a typical hardware configuration of a workstation in accordance with the subject invention having central processing unit (CPU) 410 with simultaneous multithread (SMT) processing and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A simultaneous multithread (SMT) processor comprising:
    a dynamically shared group completion table (GCT) with a first read port for a first thread and a second read port for a second thread;
    a completion unit with completion unit logic coupled to said first and second read ports for simultaneous updating of said GCT on instruction group completions; and
    a forward link array with a third read port for said first thread coupled to said completion unit logic and a fourth read port for said second thread coupled to said completion unit logic.

2. The processor of claim 1 further comprising a backward link array with a first write port for said first thread coupled to said completion unit logic and a second write port for said second thread coupled to said completion unit logic.

3. The processor of claim 1 further comprising:
    first head and tail pointer management logic for said first thread coupled to said completion unit logic and to said third read port; and
    second head and tail pointer management logic for said second thread coupled to said completion unit logic and to said fourth read port for simultaneous traversal of said GCT by each thread on instruction group completion.

4. The processor of claim 3 further comprising:
    resource calculation logic coupled to said completion unit logic, an instruction dispatch unit, and register file mapper circuits;
    circuitry for simultaneous commit of renamed result registers in said SMT processor; and
    circuitry for simultaneous updating load and store instruction identifier (Ltag and Stag) usage in said SMT processor.

5. A data processing system comprising:
    a central processing unit (CPU);
    a random access memory (RAM);
    an input output (I/O) adapter;
    a communications adapter;
    a bus coupling said CPU, RAM, I/O adapter, and said communications adapter;
    a simultaneous multithread (SMT) processor in said CPU;
    a dynamically shared group completion table (GCT) within said SMT processor with a first read port for a first thread and a second read port for a second thread;
    a completion unit with completion unit logic coupled to said first and second read ports for simultaneous updating of said GCT on an instruction group completion; and
    a forward link array with a third read port for said first thread coupled to said completion unit logic and a fourth read port for said second thread coupled to said completion unit logic.

6. The data processing system of claim 5 further comprising a backward link array with a first write port for said first thread coupled to said completion unit logic and a second write port for said second thread coupled to said completion unit logic.

7. The data processing system of claim 6 further comprising:
    first head and tail pointer management logic for said first thread coupled to said completion unit logic and to said third read port; and
    second head and tail pointer management logic for said second thread coupled to said completion unit logic and to said fourth read port for simultaneous traversal of said GCT by each thread on instruction group completion.

8. The data processing system of claim 7 further comprising:
    resource calculation logic coupled to said completion unit logic, an instruction dispatch unit, and an instruction sequencer unit;
    circuitry for simultaneous commit of renamed result registers in said SMT processor; and
    circuitry for simultaneous updating load and store instruction tag usage in said SMT processor.

9. A method for improving the performance of a simultaneous multithread (SMT) processor with a dynamically shared group completion table (GCT) coupled to a completion unit comprising the steps of:
    providing said dynamically shared GCT with a first read port for a first thread and a second read port for a second thread;
    coupling completion unit logic in said completion unit to said first and second read ports for simultaneous updating of said GCT on instruction group completions;
    coupling a forward link array to said completion unit logic with a third read port for said first thread; and
    coupling said forward link array to said completion unit logic with a fourth read port for said second thread.

10. The method of claim 9 further comprising the steps of:
    coupling a backward link array to said completion unit logic with a first write port for said first thread; and
    coupling said backward link array to said completion unit logic with a second write port for said second thread.

11. The method of claim 10 further comprising the steps of:
- coupling first head and tail pointer management logic for said first thread to said completion unit logic and to said third read port;
- coupling second head and tail pointer management logic for said second thread to said completion unit logic and to said fourth read port; and
- traversing said GCT simultaneously by thread on instruction group completions.

12. The method of claim 11 further comprising the steps of:
- coupling resource calculation logic to said completion unit logic, an instruction dispatch unit, and an instruction sequencer unit;
- committing simultaneously renamed result registers for each thread in said SMT processor; and
- simultaneously updating load and store instruction tag usage for each thread in said SMT processor.

* * * * *